Feb. 16, 1965     D. F. SURRATT     3,169,565

SELF LOCKING SCREW

Filed June 14, 1961

PRIOR CONSTRUCTION

Inventor,
Dwight F. Surratt,
by Harold Levine
Atty.

United States Patent Office 3,169,565
Patented Feb. 16, 1965

3,169,565
SELF LOCKING SCREW
Dwight F. Surratt, Versailles, Ky., assignor to Texas Instruments Incorporated, Dallas, Tex., a corporation of Delaware
Filed June 14, 1961, Ser. No. 116,997
1 Claim. (Cl. 151—14)

This invention relates to threaded devices and more particularly to so-called "self-locking" or "vibration resistant" type screws or threaded fasteners.

Among the several objects of the invention may be noted the provision of a new and improved threaded fastener of the so-called "self-locking" type or "vibration resistant" type which, when properly disposed in threaded engagement within a threaded aperture of member, provides for improved torque stability; i.e., resistance to rotation; the provision of a threaded fastener device of the class described which will not cause or will at least minimize thread damage, chipping and galling in the threaded aperture of a member into which the fastener is threaded; the provision of a threaded fastener of the class described which provides for improved distribution of stresses, particularly in critical areas of the device and the provision of a fastener, screw or bolt of this class which may be manufactured simply and inexpensively.

Other objects and features will be in part apparent and in part pointed out hereinafter.

The invention accordingly comprises the elements and combination of elements, features of construction and manipulation, and arrangements of parts which will be exemplified in the structures hereinafter shown and described and the scope of which will be indicated in the following claim.

In the accompanying drawings in which one of various possible embodiments of the invention is illustrated, FIG. 1 is an elevational view of an example of a prior construction;

Similar reference characters indicate corresponding parts throughout the several views of the drawings.

Figure 2:
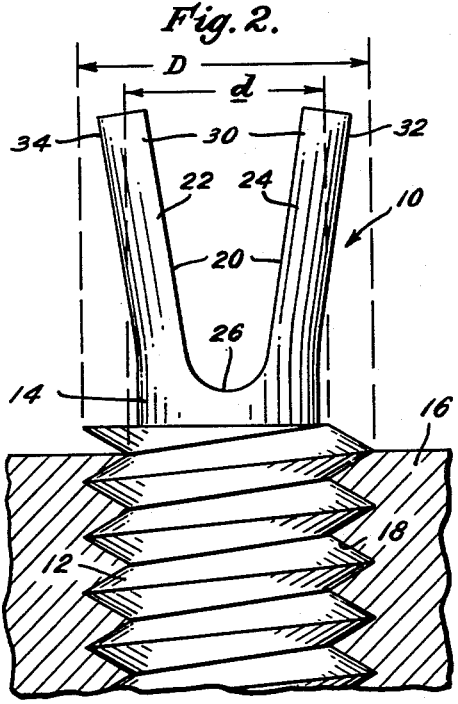
FIG. 2 is an elevational view of a threaded fastener according to the present invention, shown in partially threaded engagement with an internally threaded member shown in section.

Dimensions of certain of the parts as shown in the drawing have been modified for the purposes of clarity of illustration.

So-called "self-locking" or "vibration resistant" type screws have many applications and are particularly useful for calibration purposes, for example, in thermostats and electrical switches where accuracy and reliability is required. Such thermostats and switches may be subject to considerable vibration and it is important that such screws as used in these applications maintain their final adjusted calibrated position in service. It is, therefore, particularly important that such screws have an inherent or secondary resistance against loosening during operation. Generally, secondary locking or sealing mediums such as epoxies, sealing compounds, etc., leave much to be desired from a standpoint of dependability and in that they are generally difficult and inconvenient to handle, and usually involve a costly secondary or extra operation.

Figure 1:
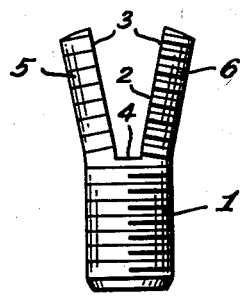

In FIG. 1 is shown an example of a prior construction of a conventional type set screw. The prior construction shown in FIG. 1 generally comprises a threaded cylindrical member 1, a portion of which is slotted as at 2, and expanded as at 3 to provide threaded slotted head portions 5 and 6 which are designed to provide some degree of resistance to rotation of the screw when the latter is disposed in mating threaded engagement within an internally threaded aperture of a base or support member. It will be noted that the threaded head portions 5 and 6 in the unexpanded condition have the same external diameter as the remainder of the screw. In the past, several problems have been encountered with the conventional type of split head set screw shown in FIG. 1. It has been found in many cases that the conventional type split head set screw as shown in FIG. 1 is incompatible with the threaded aperture in the member in which the screw is threaded, in that the split-head portions 5 and 6 tend to act as a rotary broach or an expanded tap, causing considerable thread damage in the base member along with chipping and galling as the screw is threaded into the base. These problems are considerably accelerated or aggravated in those cases where the screw is formed of a relatively hard material; for example, 1214 case hardened steel and the threaded base member is formed of a relatively soft material; such as, for example, brass or plastic. In addition, the slotted-type prior construction which is shown in FIG. 1 generally has a rectangular bight portion 4 which has a tendency to create undesirable stress concentrations at the corners of the slot. The present invention obviates or at least minimizes the problems which manifest themselves with the conventional type split head set screw, an example of which is shown in FIG. 1, and discussed above.

Figure 3:
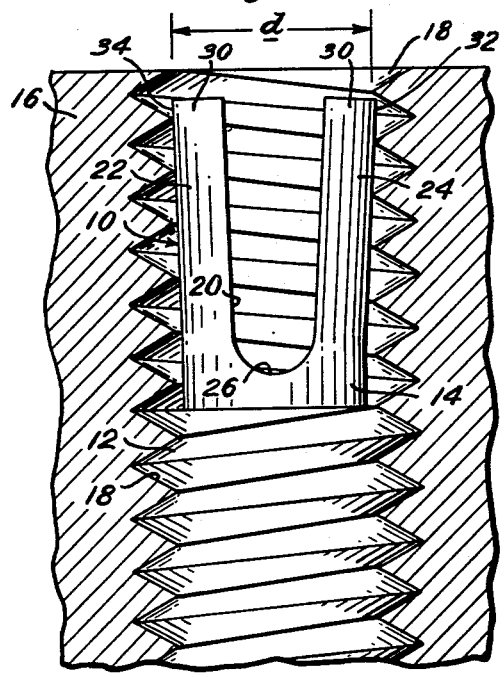
FIG. 3 is an elevational view similar to FIG. 2 showing the threaded fastener in self-locking, fully threaded engagement within the threaded aperture of the member shown in FIG. 2.
Figure 4:
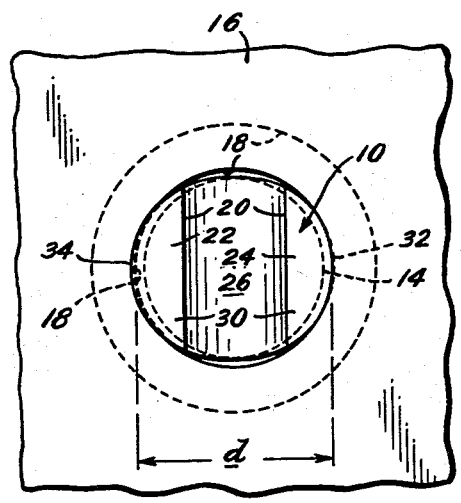
FIG. 4 is a plan view of FIG. 3.

Referring now to FIGS. 2 through 4, there is shown a threaded fastener according to the present invention in the form of a recessed, split head type screw or threaded fastener generally referred to by numeral 10. Screw 10 comprises a first threaded cylindrical portion 12 and an axially aligned, interconnected, unthreaded, elongated cylindrical head portion 14. Threaded portion 12 is adapted to be received in mating threaded engagement within a threaded cavity or aperture 18 provided by a member 16 shown in fragmentary sectional form in FIGS. 2 and 3. Member 16 may for example be a support or base member forming a part of a thermostatic switch. Threaded cylindrical portion 12 and threaded aperture 18 has a major diameter and a minor diameter labeled respectively in the drawings as D and d. In accordance with the present invention, the diameter of unthreaded, cylindrical portion 14, at least at a part thereof which is unexpanded and adjacent its interconnection with threaded part 12, is less than the minor diameter d of threaded portion 12 and threaded aperture 18 as clearly seen in the FIG. 2 condition. A substantial portion of unthreaded cylindrical portion 14 is bifurcated by means of a substantially U-shaped open ended slot 20 extending longitudinally of elongated head portion 14 to provide a pair of spaced split head sections or segments 22 and 24 as best seen in FIGS. 2 and 3. It will be noted that the bight portion 26 of U-shaped slot 20 is curvilinear or arcuate in shape, as best seen in FIGS. 2 and 3, which advantageously avoids the creation of undesirable stress concentrations at these critical areas.

Split head portions or segments 22 and 24 are expanded or sprung radially outwardly by spreading the outer ends 30 of segments 22 and 24 apart with any suitable tool until they permanently assume the diverging configuration shown in FIG. 2.

It will be noted that in the FIG. 2 configuration or condition, the largest cross-sectional or transverse dimension or distance between portions of remote or outwardly facing surfaces (e.g. as at 32 and 34) of segments 22 and 24 is greater than the minor diameter of the threaded part 12 or threaded aperture 18. When screw 10 is rotated and screwed into threaded aperture 18 of the base or support member 16, to move the screw 10 from the FIG. 2 to the FIG. 3 position, segments 22 and 24 are resiliently compressed or forced to move toward each other. The compressed segments 22 and 24 tend to spring outwardly from the condition of FIG. 3 to assume the diverging configuration of FIG. 2, and thus establish adequate friction between the unthreaded split head segments 22 and 24 and the threads of cavity 18 to prevent screw 10 from rotating under vibration. This friction, however, is not sufficient to prevent manual adjustment of screw 10.

Although it is preferred that screw 10 be entirely disposed in threaded cavity 18 as shown in FIG. 3 to obtain maximum torque stability, it should be understood that there may be certain cases in which only a portion of expanded diverging head segments 22 and 24 need be disposed within cavity 18. It will be understood that since the largest cross sectional or transverse dimension between remote surface portions of diverging split head sections 22 and 24 is greater than the minor diameter of threaded aperture 18, split head portions 22 and 24 will be forced into resilient pressure engagement with the threaded cavity 18 at a time before screw 10, in moving from the FIG. 2 to the FIG. 3 position, is entirely disposed within cavity 18.

The unthreaded cylindrical portion 14 of the screw 10 having an unexpanded diameter which is smaller than the minor diameter of the threaded hole 18 advantageously presents an unthreaded cylindrical surface to the mating thread of aperture 18 and serves to virtually eliminate, or at least minimize, damage to the threads of aperture 18 and to advantangeously eliminate chipping and galling. It can be seen that the screw of the present invention in contrast to many prior constructions particularly of the type shown in FIG. 1, does not act as a rotary broach or expanded tap which could cause thread damage and is particularly useful when the screw is formed of a relatively hard material and the threaded base member which receives the screw, is formed of a relatively soft material.

Although a single slot 20 has been shown to provide the bifurcated expanded split head sections 22 and 24, it should be understood that where dimensions and materials permit, more than one slot may be employed to provide a plurality of pairs of split head portions 22 and 24 if desired.

It is to be understood that the invention is not limited in its application to the details of construction and arrangement of parts illustrated in the accompanying drawings, since the invention is capable of other embodiments and of being practiced or carried out in various ways.

Also it is to be understood that the phraseology or terminology employed herein is for the purpose of description and not of limitation.

In view of the above, it will be seen that the several objects of the invention are achieved and other advantageous results attained.

I claim:

In combination; a member providing a threaded cavity wherein the threads of said cavity extend to the surface of said member; a self-locking type threaded fastener, said fastener being formed of a relatively hard material and said member being formed of a relatively soft material, said fastener comprising first and second axially aligned interconnected portions, said first portion being cylindrical and at least a part thereof being threaded, said threaded part having a major and a minor diameter, said major diameter constituting the largest dimension of said first portion, said second portion being unthreaded and having an axially extending slot therein to provide at least a pair of spaced apart head segments, said head segments having curvilinear peripheral surface portions forming part of a cylinder; said head segments being radially expanded in a direction away from each other so that at least a part of the curvilinear surface portions of each of said head segments normally extends radially outwardly beyond the minor diameter of said threaded part, said fastener being rotated into threaded engagement within said threaded cavity, said part of said curvilinear surface portions engage the threads of said cavity adjacent said surface whereby said head segments are resiliently forced toward each other by the threads of said threaded cavity, said curvilinear surface portions having a radius of curvature which is less than the radius of curvature of said minor diameter of said threaded part whereby the edges formed at the intersection between said slot and said curvilinear surface portions of said head segments are maintained out of engagement with the threads in said threaded cavity when said fastener is rotated into threaded engagement within said threaded cavity while, in the locking position, said curvilinear surface portions engage the threads of said threaded cavity in said member.

References Cited in the file of this patent

UNITED STATES PATENTS

| | | |
|---|---|---|
| 733,533 | Bailey | July 14, 1903 |
| 1,061,844 | Howerton | May 13, 1913 |
| 1,292,707 | Clark | Jan. 28, 1919 |
| 2,202,928 | Shaw | June 4, 1940 |
| 2,640,521 | Zavoico | June 2, 1953 |
| 2,740,327 | Stegeman | Apr. 3, 1956 |